United States Patent
Schmitt et al.

(10) Patent No.: US 10,864,714 B2
(45) Date of Patent: Dec. 15, 2020

(54) METHOD AND DEVICE FOR ADDITIVELY PRODUCING COMPONENTS

(71) Applicant: GKN Sinter Metals Engineering GmbH, Radevormwald (DE)

(72) Inventors: Rainer Schmitt, Wachtberg (DE); Simon Höges, Overath (DE); Ümit Aydin, Wachtberg (DE); Richard Kallee, Ratingen (DE); Peter Mölgg, Brunneck (IT)

(73) Assignee: GKN Sinter Metals Engineering GmbH, Radevormwald (DE)

( * ) Notice: Subject to any disclaimer, the term of this patent is extended or adjusted under 35 U.S.C. 154(b) by 418 days.

(21) Appl. No.: 15/547,881

(22) PCT Filed: Jan. 29, 2016

(86) PCT No.: PCT/EP2016/051958
§ 371 (c)(1),
(2) Date: Aug. 1, 2017

(87) PCT Pub. No.: WO2016/124502
PCT Pub. Date: Aug. 11, 2016

(65) Prior Publication Data
US 2018/0015544 A1    Jan. 18, 2018

(30) Foreign Application Priority Data
Feb. 2, 2015    (DE) .................. 10 2015 201 775

(51) Int. Cl.
*B33Y 10/00*    (2015.01)
*B32B 1/02*    (2006.01)
(Continued)

(52) U.S. Cl.
CPC .............. *B33Y 10/00* (2014.12); *B22F 3/003* (2013.01); *B22F 3/008* (2013.01); *B22F 3/1055* (2013.01);
(Continued)

(58) Field of Classification Search
CPC .. B32B 1/02; B22F 3/003; B22F 3/008; B22F 3/1055; B22F 3/16; B33Y 10/00; B33Y 30/00; B33Y 50/02; B33Y 80/00
See application file for complete search history.

(56) References Cited

U.S. PATENT DOCUMENTS

| 5,932,059 A | 8/1999 | Langer et al. |
| 2004/0012124 A1 | 1/2004 | Li et al. |

(Continued)

FOREIGN PATENT DOCUMENTS

| DE | 4309524 C2 | 5/1998 |
| DE | 19903436 C2 | 2/2001 |

(Continued)

OTHER PUBLICATIONS

PCT International Search Report, PCT/EP2016/051958, dated May 10, 2016, 7 pages.

(Continued)

*Primary Examiner* — Walter Aughenbaugh
(74) *Attorney, Agent, or Firm* — Quarles & Brady LLP

(57) ABSTRACT

The invention relates to a method for producing a body by means of an additive production method (AM) by using metal powder, comprising the following steps: designing the body in a computer-simulated manner while taking into account at least one region of the body to be processed and transferring data to an additive production device, in particular an additive powder-bed production device, successively providing the metal powder in order to construct powder layers arranged one on the other, successively (Continued)

Figure 1:
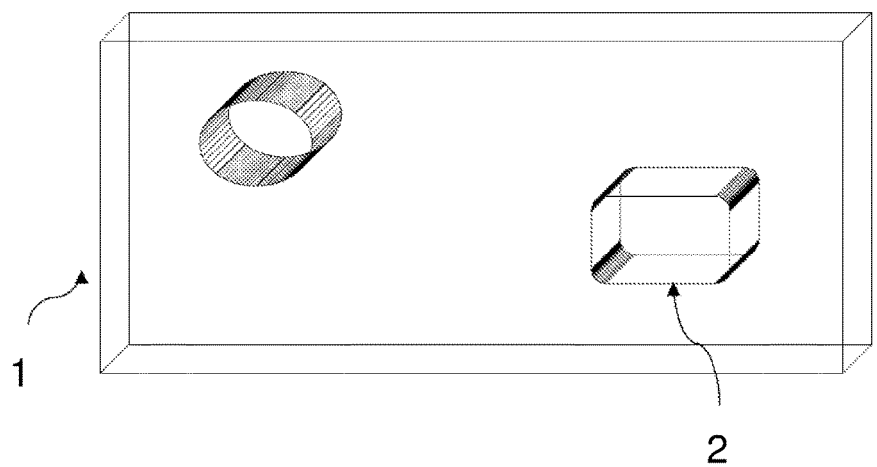

hardening parts of the powder layers in order to form at least one specified structure in the powder layers arranged one on the other, wherein the structure is at least partially filled with metal powder of the powder layers, and calibrating a body, which is created by means of the structure, in the region to be processed. The invention further relates to a corresponding device, to a body produced in such a way, and to a computer program product for performing the method.

9 Claims, 2 Drawing Sheets

(51) Int. Cl.
*B33Y 80/00* (2015.01)
*B33Y 30/00* (2015.01)
*B22F 3/105* (2006.01)
*B33Y 50/02* (2015.01)
*B22F 3/00* (2006.01)
*B22F 3/16* (2006.01)

(52) U.S. Cl.
CPC .................. *B22F 3/16* (2013.01); *B32B 1/02* (2013.01); *B33Y 30/00* (2014.12); *B33Y 50/02* (2014.12); *B33Y 80/00* (2014.12); *B22F 2202/01* (2013.01); *B22F 2203/00* (2013.01); *B22F 2203/03* (2013.01); *B22F 2207/17* (2013.01); *Y02P 10/295* (2015.11)

(56) References Cited

U.S. PATENT DOCUMENTS

| | | |
|---|---|---|
| 2006/0198916 A1 | 9/2006 | Beeck et al. |
| 2011/0224796 A1 | 9/2011 | Weiland et al. |
| 2011/0286874 A1 | 11/2011 | Low et al. |
| 2012/0164322 A1 | 6/2012 | Teulet |
| 2014/0010908 A1 | 1/2014 | Matsumoto et al. |
| 2014/0349132 A1 | 11/2014 | Uhlmann et al. |

FOREIGN PATENT DOCUMENTS

| | | |
|---|---|---|
| DE | 102007039035 B3 | 1/2009 |
| DE | 102010008781 A1 | 8/2011 |
| DE | 102011089194 A1 | 6/2013 |
| EP | 2551040 A1 | 1/2013 |
| EP | 2570595 A1 | 3/2013 |
| GB | 2491472 A | 12/2012 |
| WO | 2013167903 A1 | 11/2013 |
| WO | 2013167904 A1 | 11/2013 |
| WO | 2014095208 A1 | 6/2014 |
| WO | 2014179822 A1 | 11/2014 |

OTHER PUBLICATIONS

PCT Written Opinion, PCT/EP2016/051958, dated May 10, 2016, 16 pages.

European Patent Office, Examination Report, Application No. 16703085.7, dated Apr. 8, 2019, 9 pages [English Language Translation Unavailable].

European Patent Office, Examination Report, Application No. 16703085.7, dated Feb. 7, 2020, 9 pages [English Language Translation Unavailable].

China National Intellectual Property Administration, Third Office Action, Application No. 201680019301.6, dated Mar. 31, 2020, 8 pages [English Language Translation Unavailable].

METHOD AND DEVICE FOR ADDITIVELY PRODUCING COMPONENTS

This application represents the U.S. national stage entry of International Application No. PCT/EP2016/051958 filed Jan. 29, 2016, which claims priority to German Patent Application No. 10 2015 201 775.3 filed Feb. 2, 2015, the disclosure of which is incorporated herein by reference in its entirety and for all purposes.

The present invention concerns a method and a device for the additive production of a body, as well as a body so produced. Preferably, a powder bed method is employed as the additive method.

Additive manufacturing, also known as generative fabrication, rapid prototyping, rapid manufacturing or 3D printing, has been a heightened focus of development and industrial implementation since the late 1990s. At first used for the production of functional models and prototypes, as well as tooling, since the 2000s there have also been applications in series production. Examples can be found in particular in medical technology with the fabrication of dental prostheses, individual bone replacement implants, as well as complex instruments. An early implementation in series manufacturing was also achieved in the tool and die field, especially by the production of injection molding forms with integrated cooling channels. There are various applications in aviation shortly before the start of production, such as weight-reduced brackets or turbine components. But all applications in series manufacturing thus far lie in high-price market segments in which there are either high material costs or costly process chains for the manufacturing of the components.

In powder bed-based additive fabrication, a powderlike material is deposited in layers and solidified layer by layer at the locations defined by a CAD data set of the component being fabricated. After each solidification, the platform on which the component is being built is lowered by one layer thickness and a further powder layer is deposited.

One benefit of additive manufacturing is directly apparent through this principle of the method: its freedom of geometry. Thus, components can easily be fabricated with undercuts, internal structures, free form surfaces or hollow structures, such as are not even achievable by conventional methods or only achievable with considerable expense. Furthermore, thanks to additive manufacturing from powder material, the actual material needed corresponds to the weight of the final component; nonmelted powder is recycled in the process. Along with a low energy requirement, the method is very resource-sparing as compared to casting or milling.

So far this method has not been documented with a successful implementation in the series manufacturing of price-sensitive market segments, such as automotive. Furthermore, additive manufacturing is used there only to make prototypes and shakedown series. The reason for this is high component costs, which especially in larger lot numbers (>1000 units per year) are not competitive with conventional methods. The benefits of weight savings and added functional value do not outweigh this deficit. The reason for the high component costs lies primarily in long fabrication times and thus high costs for the depreciation of the machine,
large expense for surface finishing of functional surfaces,
high material costs due to costly production of the raw material (powder).

In order to accomplish an implementation of the production method in the mentioned markets, these deficits must be reduced. The present invention shows approaches for reducing the long fabrication times and the high cost of surface finishing.

The starting point for the discussion is to employ a shell and core principle in the design, such as can be found already in principle in DE 10 2007 039 035 B3, for example. A 3D data set to be produced is divided into a shell region and a core region.

The outer shell with a certain wall thickness is differentiated from the volume region of the component. Thanks to this splitting up of the data set, different process parameters may be assigned to the two regions and thus different properties can be achieved on the component. DE000004309524C2 describes how greater laser power and greater layer thicknesses are realized in the volume region, in order to increase the tree speed, while in the shell region parameters are chosen to generate slight surface roughness. However, the increasing of the buildup rate with this approach is only possible in limits, since the powder continues to be solidified with the laser.

In DE000019903436C2 and DE102007039035B3 the volume region is not solidified, the powder is removed from the cavity after the AM process and a metal is cast into the cavity. In this case, openings must be provided each time in order to remove the powder and pour in the metal.

DE102011089194A1 describes carrying out the entire AM process with nanoscale powder, but the powder in the volume region is not solidified, but instead remains in the cavity. This can then be solidified by furnace sintering.

The finishing of the surfaces on a component that has been fabricated with AM is described in the literature primarily by mechanical, chip-removing finishing. In particular, WO 2013167903 A1 and WO 2013167904 A1 are relevant here. The focus of the literature lies primarily on the choice of the referencing of the semifinished piece made in the AM method in the following chip-removing process. However, in an economic consideration, chip-removing finishing offers only slight potential for lowering the production costs. There is a need here for cost-effective and highly automated finishing methods.

The object of the present invention is to boost the productivity of an additive manufacturing method.

This problem is solved with a method having the features of claim 1, with a manufacturing unit having the features of claim 11, a green body having the features of claim 15, a body having the features of claim 16 or 17, and with a computer program product having the features of claim 20. Advantageous embodiments and modifications will appear from the following subclaims, as well as the following description and the figures. The independent claims constitute a first preliminary attempt to formulate the subject matter of the invention. However, the respective features of the independent claims may be amplified, stricken out, or also replaced by one or more other features of the disclosure.

A method is proposed for producing a body by means of an additive manufacturing (AM) method by using metallic powder, with the following steps:

computer-simulated design of the body while taking into account at least one region of the body to be processed and transferring data to an additive manufacturing device,
successive providing of the metallic powder in order to construct powder layers arranged one on the other,
successive hardening of parts of the powder layers in order to form at least one specified structure in the powder layers arranged one on the other, wherein the structure is at least partly filled with metallic powder of the powder layers, and calibrating a body, which is created by means of the structure, in the region to be processed.

The computer-simulated designing of the body makes it possible for the additive manufacturing by placement of powder layers one on top of another to create structures which other manufacturing methods cannot accomplish. The material used can also be adapted appropriately to the structure being created. Thus, in a first embodiment, it is possible to use only a single material to create the structure and the body obtained from the structure. A second embodiment, on the other hand, calls for possibly using different materials within the structure.

The surfaces of components generated by means of AM depending on the process parameters and the material used have a surface roughness between Ra=5-10 µm [micrometer]. When the components are used in a subassembly, this usually requires a mechanical finishing of at least part of the surfaces in order to comply with necessary component tolerances. In order to use the "calibration" method employed in powder metallurgy, the AM process must be adapted so that, similar to the above-described shell and core technique, mechanical properties different from the core are introduced into the marginal region by the AM process, which is then finished during the calibration. This change in the mechanical properties can be achieved by a lesser density, different microstructure (e.g., grain size), or a (bionic) structure introduced during the design process (in the component design).

Furthermore, it has been found to be an advantage in the fabrication for the structure in an inner region to undergo an at least almost complete compacting, while an outer region of the structure continues to have a certain porosity. This enables, for example, faster processing times of the additive manufacturing method. Thus, for example, one wall of the structure may have in its outer region a density between 90% and 98% of the total density, while an inner region of the wall has a total density. After this, thanks to the much faster calibration, that region of the structure or of the body so obtained which requires such an adapting can then be processed. But other outer regions of the body will then remain unprocessed and may be used functionally, for example on account of their porosity.

One modification of the method calls for the powder to be repeatedly compacted during the additive manufacturing method. Such a compacting has benefits, since a greater density may be achieved more quickly in this way, if laser treatment then follows. The compacting may be done at different times and/or with different means. For example, the compacting may also be done by simultaneous use of different physical means: for example, by applying pressure and/or by applying vibrations and/or by mechanical raking of the powder.

For example, it is possible to mechanically compact the powder of individual powder layers.

In AM processes, a thin powder layer (30-200 µm [micrometer]) is applied in the beginning by various mechanisms on a substrate plate. This powder layer is generally created by gravity with the bulk density of the powder and evened out by a shifting device. In order to improve the AM outcome in regard to an achievable high density, a compacting of the powder is advantageous. Especially for the above-described process, the density of the sintered powder is dependent on the density of a powder layer created in the AM process. With a compacting of the powder layer during the depositing of the powder, a higher density may be achieved directly after the sintering and thus a higher strength of the generated and sintered component.

It is preferred to shake the powder for the compacting.

In US2012164322A1, compacting with a revolving roller is described. With this technique, the bulk density of the powder can be increased. Also an angulated plate, as described in DE 10 2010 008 781 A1, does not allow any significant increasing of the density of the powder bed. For the AM process, a greater compacting by applying a pressing force to the powder layer could have positive results. Furthermore, in this way the density of the structure created by furnace sintering can be significantly increased, without bringing about a material contraction and thus a deforming of the shell.

According to a further idea of the invention, which may be self-standing or also combined with one or more of the other embodiments above or in the following, a method for producing a body by means of an additive manufacturing (AM) method by using metallic powder calls for the following steps:

preferably computer-simulated design of the body while taking into account at least one region of the body to be processed and transferring data to an additive manufacturing device, especially an additive powder bed manufacturing device, successive providing of the metallic powder in order to construct powder layers arranged one on the other, excitation of the metallic powder by means of vibrations, preferably ultrasound, preferably of one or more powder layers by means of these vibrations, especially ultrasound, successive hardening of parts of the powder layers in order to form at least one specified structure in the powder layers arranged one on the other, wherein the structure is preferably at least partly filled with metallic powder of the powder layers. But it also need not be filled.

The method may, but need not, call for taking into account a region for processing. By the application of ultrasound on the one hand a compacting and especially a better surface quality of the powder layer can be achieved. On the other hand, however, a flow behavior of the powder can also be influenced, especially along a conduit through which the powder is taken.

It has been discovered that the use of vibrations, especially the use of vibrations in the ultrasound range, enables a use of powders which heretofore could not be used in the additive powder bed method. Heretofore it was necessary for the powder used to meet high demands regarding roundness of the powder particles used. Under the influence of the vibration, especially ultrasound, however, it is now possible to also work with powder particles having nonround geometries. In particular, it is now possible to also use spattered powders such as are used conventionally in powder metallurgy.

For example, it is provided that a base plate of a manufacturing layout of the additive manufacturing method, a powder bed layer, and/or a part of a device for the supplying of powder for the powder deposition of the manufacturing layout is excited by means of vibrations, preferably in the ultrasound range.

Another embodiment of the method calls for the hardening of parts of the powder layers to result in a closed structure in which the powder remains intact.

Furthermore, it can be provided that the body by means of the proposed method is given a wall structure which has a lesser porosity in an inner region of the wall structure than an outer region of the wall structure, wherein preferably the inner region is given an at least approximately 100% density and the outer region of the wall structure remains porous.

In the context of the proposed methods, it is possible to adjust a powder parameter and/or a material property for an otherwise identical powder differently in one region of the wall structure than in an interior of the wall structure.

Another embodiment calls for using an additional process step: sintering. For example, it may be provided that a sintering of the at least one structure and the powder from the powder layers which is retained in the structure during the sintering occurs in a sintering furnace to form the body, wherein the powder remaining in the structure adjacent the region of the body to be processed is heated during the sintering to a temperature at which sinter necks form on powder grains of the powder and brace the region of the body to be processed.

For example, the procedure might be as follows, wherein the individual procedures in regard to the computer-simulated design can be used as in methods according to the invention which do not involve any additional sintering step:

The data set being fabricated is divided up into a shell and a core prior to the preparation for the manufacturing process. The shell is provided with manufacturing parameters so that the powder is consolidated there by the manufacturing process. The core is either left entirely without a consolidation in the AM process or it is provided with a stabilizing lattice structure. The (bionic) lattice structure serves to stabilize the entire component as well as the process by the supporting of overhangs. During the process, only the fully enclosing shell as well as any stabilizing structures present are consolidated. In the cavities so created, the starting material (powder) remains in the same density as when the layer was created. It is entirely enclosed by the shell, or with a gas outlet hole. After the fabrication process with AM, the fabricated component consisting of consolidated shell and powder contained therein is removed from the machine. The component is then sintered in the furnace with suitable sinter parameters. In this process, sinter necks are formed between the individual powder particles which were not consolidated, resulting in a consolidating of the component.

In AM processes, a thin powder layer (30-200 μm) is deposited in the beginning on a substrate plate by various mechanisms. This powder layer is generally produced by gravity with the bulk density of the powder and evened by a shifting device. In order to improve the AM process results in regard to an achievable high density, a compacting of the powder is advantageous. Especially for the above-described process, the density of the sintered powder is dependent on the density of a powder layer created in the AM process. With a compacting of the powder layer during the depositing of the powder, a higher density may be achieved directly after the sintering and thus a greater strength of the component generated and sintered.

According to a further idea of the invention, which may be pursued independently or also in dependence on the above idea, a manufacturing layout is proposed to carry out a method as described above, comprising at least one additive powder bed manufacturing device with a calibration device and/or an ultrasound device. There may also be use of several vibration devices, for example, in the form of ultrasound devices and/or vibration mechanisms in other Hertzian regions, as well as several calibration devices instead of only one. In the case of a vibration mechanism, preferably an ultrasound vibration mechanism, a mains voltage is transmitted for example by a generator into the high-frequency range. With the aid of a converter, this high-frequency can then be transformed, for example by means of a piezoelectric or magnetorestrictive exciter, into ultrasound oscillations. These, in turn, can be used to excite a conduit, a supply process, the base plate, the powder layers or some other region of the layout. In this way, oscillations may be transmitted to the powder, so that a frictional resistance in the conduit as well as a tendency to clogging may be reduced. The powder throughput can also be increased by means of this excitation, or the use of non-spherical powders can also be made possible.

Furthermore, the manufacturing layout may additionally have a sintering furnace. In this way, the material can take on additional strength and density; for example, should it be necessary for a subsequent usage of the body.

Preferably, in the event of sintering, a manufacturing layout is used in which the sintering furnace is a continuous furnace, which is part of a manufacturing line through which otherwise fabricated bodies for sintering move in parallel with the body fabricated by means of the additive manufacturing method. In this way, for example, the proposed method can be integrated in an already existing infrastructure at already existing manufacturing lines and additional investments remain manageable.

Furthermore, it can be provided that a vibration device, preferably an ultrasound device, is arranged on a base plate of a manufacturing layout of the additive manufacturing method, in particular the powder bed method, and/or on a part of a device of the manufacturing layout for the supplying of powder for the powder deposition. By means of the vibration mechanism, the powder is excited to perform slight movements within itself, so that it can better flow or be compacted.

According to a further idea of the invention, which may be provided independently or also in dependence on the other ideas, a green body is proposed for manufacturing a product, especially a metal product and/or sinter body, wherein the green body is made by an additive manufacturing method according to one of the proposed steps, wherein the green body has a wall structure having an inner region which has a lesser porosity, preferably being dense, while an outer region of the wall structure is porous. Preferably the green body takes on sufficient strength during the additive production that a sintering step is not required.

Yet another idea of the invention, which may be provided independently or also in dependence on the other ideas, provides for a metallic body, especially a sinter body, having an outer structure and a core, each of metallic material, wherein the outer structure is calibrated in a partial region, which is braced by the core, wherein the core at least in a region of the bracing of the partial region of the structure comprises a metallic material having sinter necks, and the outer structure has a higher density than the core.

According to a further embodiment of the invention, which may be provided independently or also in dependence on the other ideas, a metallic body is proposed, having an additively manufactured hollow structure of metallic material, wherein the hollow structure has an at least approximately 100% density along an inner region of a wall cross section of the hollow structure, while an outer region of this wall cross section has a density which is less than that of the inner region. It is preferably provided that the metallic body has an outer region of the hollow structure which is calibrated in a partial region.

Furthermore, it is provided that directly after being created from an additive powder bed manufacturing device an upper and/or lower surface has a lesser roughness coefficient Sa per EN ISO 25178 than a side surface of the metallic body and/or a tolerance deviation of a dimension, from the bottom upward, on the metallic body is less than a tolerance deviation of a dimension over a width of the metallic body. This is achieved, for example, by a compacting of the powder layers, since in this way a better energy distribution occurs during the selective melting of the powder, for example, as the powder particles are more closely packed together than without vibration. But in this way a surface roughness as well as precision of dimensions can also be improved.

Furthermore, a computer program product is proposed for execution on a computer, having a computational method for creating a body, preferably from an outer structure and a core contained in the structure, each of metallic powder, taking into account a partial region of the body to be calibrated. By means of the computer program product, the proposed methods can be implemented, for example by means of a manufacturing layout as described above.

The following figures show, merely as an example, a particular embodiment of the invention, without the invention being limited to this. One or more features of the respective figures may be combined with each other or also with features from the following description of figures, as well as from the above general description to form further embodiments of the invention. There are shown:

FIG. 1: A first schematic representation of a material layer used to form a shell and core system in the proposed additive manufacturing method, and FIG. 2: A second schematic representation of a structure created, forming a body, wherein an outer region of a wall of the body is calibrated.

Figure 3:
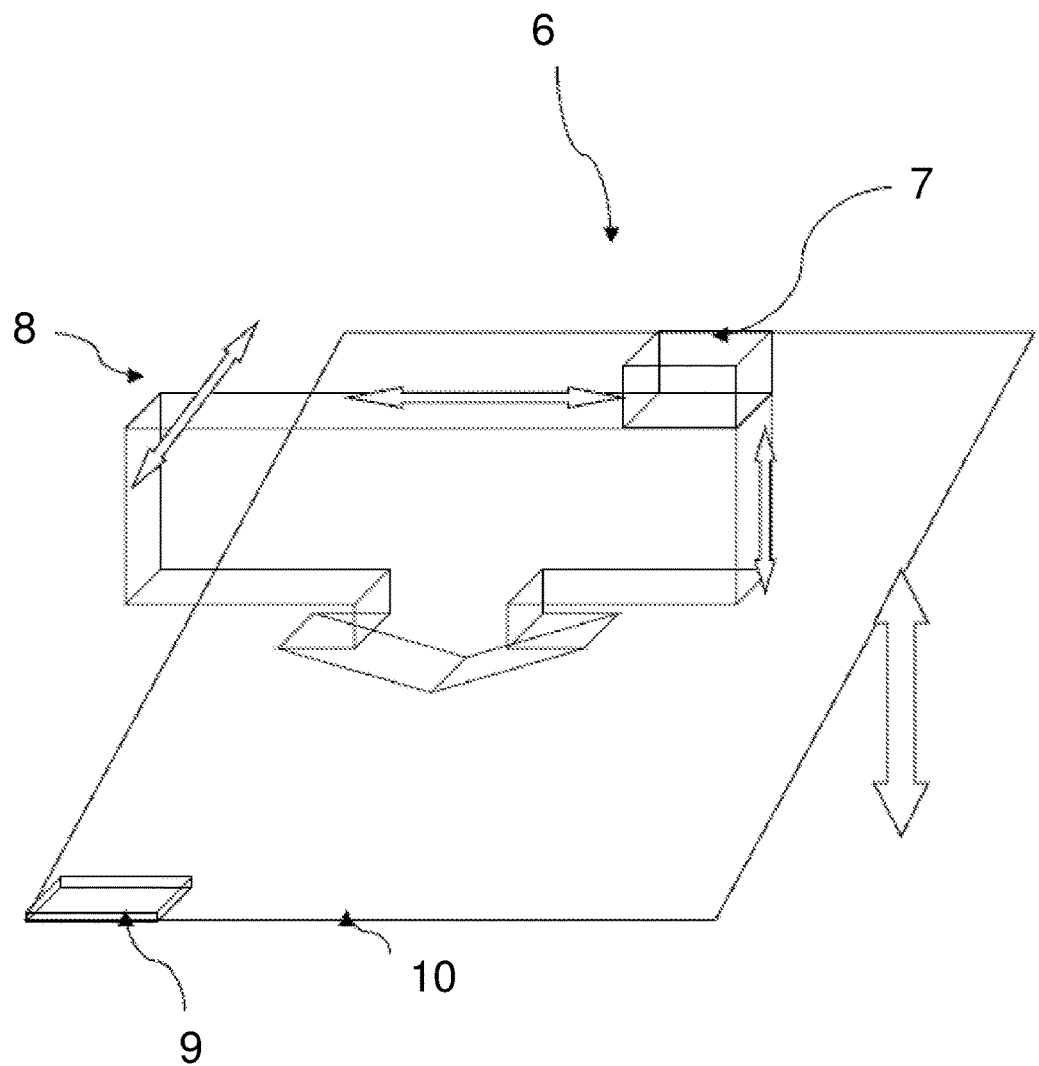

FIG. 3: In schematic, exemplary manner, a manufacturing layout utilizing a powder bed method.

FIG. 1 shows in a schematic view an aggregation of material layers 1 deposited one on the other with the proposed additive manufacturing method, in which structures 2 are formed in accordance with a shell and core system as described above. A compacting of the material layers 1 prior to the actual laser processing allows on the one hand working with better accuracies. On the other hand, the surface quality can be improved, since the powder particles are melted while lying more closely together, which results in a better space filling and more uniform distribution of the melted material.

Figure 2:
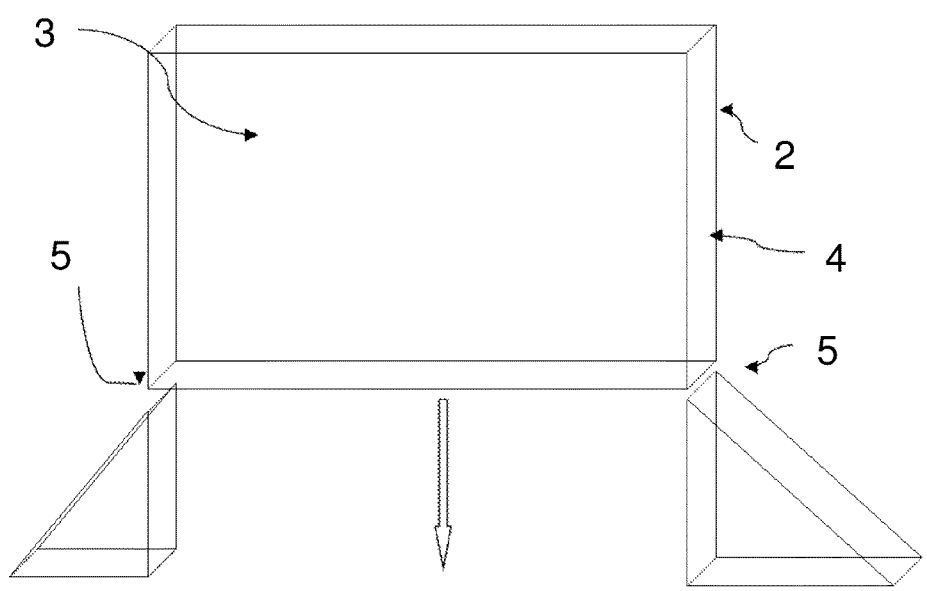

FIG. 2 shows in schematic view a second schematic representation of a created structure 2, forming a body 3, wherein an outer region of a wall 4 of the body 3 is calibrated. It is shown that two sides 5 are being calibrated, while other regions are not further compacted and thus retain their porosity.

FIG. 3 shows in simplified schematic manner a manufacturing layout 6 which utilizes a powder bed method. In this case, as the vibration device, a first ultrasound generator 7 is arranged on a traveling powder deposition mechanism 8. At least one second ultrasound generator 9 is arranged in turn on a height-adjustable base plate 10 of the manufacturing layout 6. By means of the respective ultrasound generator, the powder can be excited on its way through conduits by means of vibrations so as to increase the flow velocity in this way, but also at least preserve the flowability of the powder. Thanks to vibrations on the base plate, the powder can be better compacted, either once already deposited and/or during the deposition on the base plate or on a powder layer already laid down. The application of the vibration can be made uniform and constant, or the vibration can also be nonuniform. It is also possible to control or regulate the application of the vibrations. Depending on the powder or powder mixture being used, one or more parameters may be changed, such as the frequency, the introduced energy, the time duration of the vibration.

The invention claimed is:

1. A method for producing a body by an additive manufacturing (AM) method by using metallic powder, the method comprising the following steps:
computer-simulated design of the body while taking into account at least one region of the body to be processed and transferring data to an additive manufacturing device,
successive providing of the metallic powder in order to construct powder layers arranged one on the other,
successive hardening of parts of the powder layers in order to form at least one specified structure in the powder layers arranged one on the other, wherein the structure is at least partly filled with metallic powder of the powder layers, and
calibrating a body, which is created by the structure, in the region to be processed.

2. The method as claimed in claim 1, wherein the powder is repeatedly compacted during the additive manufacturing method.

3. The method as claimed in claim 1, wherein the powder of individual powder layers is mechanically compacted.

4. The method as claimed in claim 1, wherein the powder is shaken for the compacting.

5. A method as claimed in claim 1, for producing a body by an additive manufacturing (AM) method by using metallic powder, the method comprising the following steps:
computer-simulated design of the body while taking into account at least one region of the body to be processed and transferring data to an additive manufacturing device,
successive providing of the metallic powder in order to construct powder layers arranged one on the other,
excitation of the metallic powder by vibration,
successive hardening of parts of the powder layers in order to form at least one specified structure in the powder layers arranged one on the other, wherein the structure is at least partly filled with metallic powder of the powder layers.

6. The method as claimed in claim 1, wherein a base plate of a manufacturing layout of the additive manufacturing method, a powder layer, and/or a part of a device for the supplying of powder for the powder deposition of the manufacturing layout is excited by vibrations.

7. The method as claimed in claim 1, wherein the hardening of parts of the powder layers results in a closed structure in which the powder remains intact.

8. The method as claimed in claim 1, wherein the body has a wall structure which has a lesser porosity in an inner region of the wall structure than an outer region of the wall structure, wherein the inner region is given an at least approximately 100% density and the outer region of the wall structure remains porous.

9. The method as claimed in claim 1, wherein a sintering of the at least one structure and the powder from the powder layers which is retained in the structure during the sintering occurs in a sintering furnace to form the body, wherein the powder remaining in the structure neighboring the region of the body to be processed is heated during the sintering to a temperature at which sinter necks form on powder grains of the powder and brace the region of the body to be processed.

* * * * *